Dec. 13, 1960 S. M. ANOFF 2,964,609
FOOD PRESERVING CABINET CONSTRUCTION
Filed July 1, 1957 9 Sheets-Sheet 1

INVENTOR
SEYMOUR M. ANOFF

BY

ATTORNEYS

Dec. 13, 1960      S. M. ANOFF      2,964,609
FOOD PRESERVING CABINET CONSTRUCTION
Filed July 1, 1957      9 Sheets-Sheet 2

INVENTOR
SEYMOUR M. ANOFF

BY

ATTORNEYS

Dec. 13, 1960     S. M. ANOFF     2,964,609
FOOD PRESERVING CABINET CONSTRUCTION
Filed July 1, 1957     9 Sheets-Sheet 3

INVENTOR
SEYMOUR M. ANOFF

BY

ATTORNEYS

Dec. 13, 1960  S. M. ANOFF  2,964,609
FOOD PRESERVING CABINET CONSTRUCTION
Filed July 1, 1957  9 Sheets-Sheet 4

INVENTOR
SEYMOUR M. ANOFF
BY
ATTORNEYS

Dec. 13, 1960 S. M. ANOFF 2,964,609
FOOD PRESERVING CABINET CONSTRUCTION
Filed July 1, 1957 9 Sheets-Sheet 5

INVENTOR
SEYMOUR M. ANOFF

BY

ATTORNEYS

Dec. 13, 1960  S. M. ANOFF  2,964,609
FOOD PRESERVING CABINET CONSTRUCTION
Filed July 1, 1957  9 Sheets-Sheet 6

INVENTOR
SEYMOUR M. ANOFF

BY
*Gravely Lieder Woodruff & Wells*

ATTORNEYS

INVENTOR
SEYMOUR M. ANOFF

ATTORNEYS

INVENTOR
SEYMOUR M. ANOFF

Dec. 13, 1960  S. M. ANOFF  2,964,609
FOOD PRESERVING CABINET CONSTRUCTION
Filed July 1, 1957  9 Sheets-Sheet 9

INVENTOR
SEYMOUR M. ANOFF

BY

ATTORNEYS

United States Patent Office 2,964,609
Patented Dec. 13, 1960

2,964,609

FOOD PRESERVING CABINET CONSTRUCTION

Seymour M. Anoff, 528 Jackson St. Glencoe, Ill.

Filed July 1, 1957, Ser. No. 669,053

11 Claims. (Cl. 219—35)

This invention relates to improvements in the construction of food preserving cabinets.

An object of the present invention is to provide a cabinet which will overcome the problem of keeping hot foods in kitchen-fresh condition until served, and will hold foods for extended periods of time in either moist or dry condition.

An object of this invention is also to provide a food preserving cabinet wherein foods may be stored in advance of rush periods in order to achieve the maximum use of food preparation equipment.

It is a further object of this invention to provide an improved cabinet construction that will make portion control of food more accurate and easy so that hot food portions can be served almost immediately upon customer demand.

A further object of the present invention is to construct a cabinet for holding hot foods either dry or moist without the use of steam or hot water so that moist foods are prevented from drying out and dry foods are kept from becoming moist and soggy.

Another object of the invention is to construct a food preserving cabinet so that foods can be separated to avoid the objectionable intermingling of flavors, thereby making it possible to store many different foods in the same cabinet, and to provide a cabinet having a construction which will be easily kept clean and sanitary to avoid the accumulation of spilled foods.

A still further object of the invention is to construct a food preserving cabinet of few parts to achieve strength and rigidity, and to allow the advantage of adjustability and removability of parts for inspection and maintenance.

Another object is to provide a food preserving cabinet construction in which separate compartments for the foods may be rendered easily accessible from opposite sides of the cabinet, and to provide interchangeable parts so that different styles of cabinets can be assembled where access from one side is desirable.

Yet another object of the invention is to construct a feed preserving and storage cabinet with an outer shell and an inner frame or skeleton separated by a body of insulation, to connect the shell and frame with a minimum of direct contact points to reduce the heat loss, and to support the food receiving compartment means in such a manner as to allow convenient removal for inspection and cleaning without the necessity of dismantling the cabinet.

A still further object is to provide a food preserving cabinet in which the compartment closures can be utilized as shelves when open, and to achieve this end it is an object to provide a novel form of closure hinge having a built-in stop, one in which the working parts are fully concealed to avoid the accumulation of foreign matter, food dripping, and the like, and to incorporate an externally adjustable but concealed tension spring to assure proper closure operation.

The particular object, therefore, is to provide an improved and novel construction of parts for a food preserving cabinet to carry out the foregoing enumerated objects.

Other and further objects of this invention will be made to appear from the following detailed description of certain preferred embodiments which will be illustrated in the accompanying drawings.

The invention broadly consists in those parts and assemblies of a cabinet wherein an outer shell and an inner frame or skeleton structure are combined to achieve the objects hereof in an economical, strong, rigid and sanitary manner, and the invention further consists in the details of certain items of hardware and heat control means whereby the preserving of moist or dry food can be obtained for long periods of time.

Figure 1:
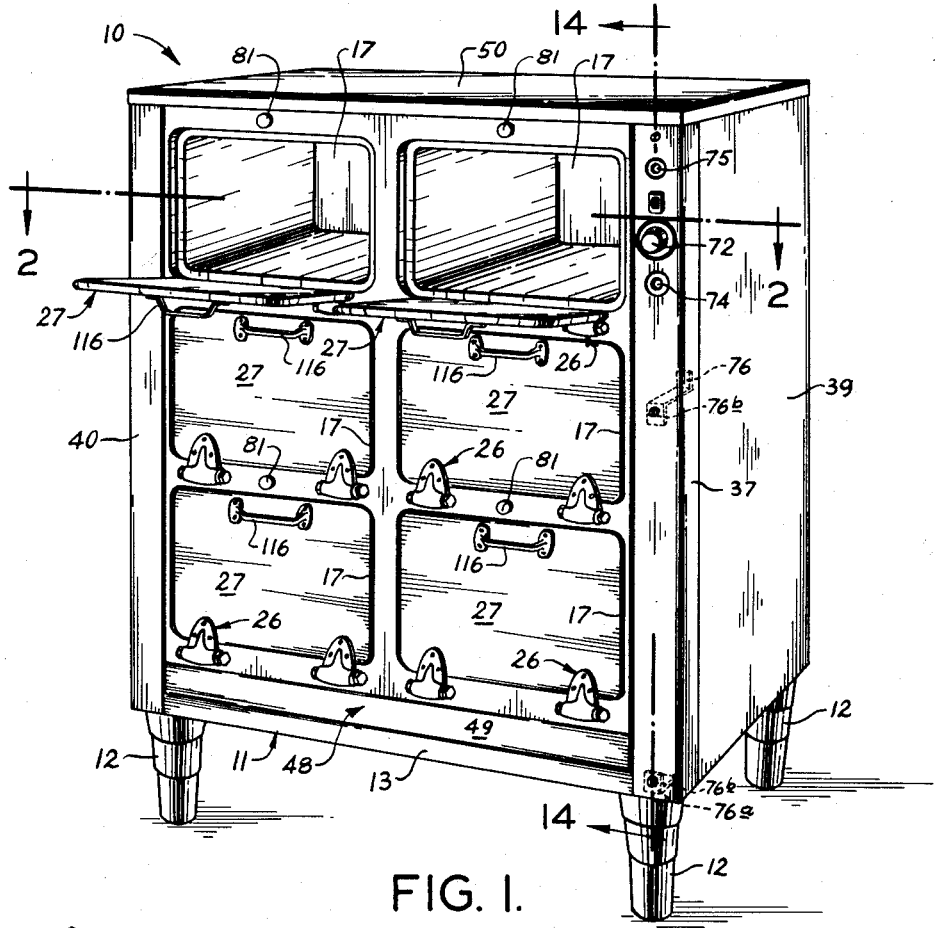
Fig. 1 is a perspective view of the improved food preserving cabinet in which the compartments are adapted for pass-through use.
Figure 7:
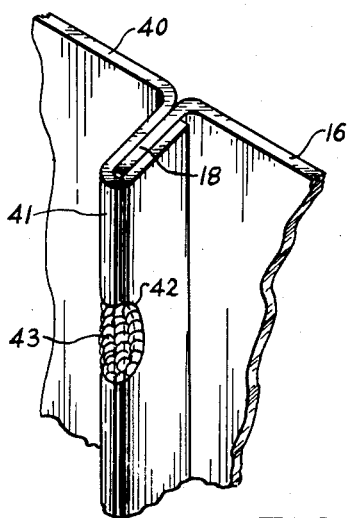
Fig. 7 is a greatly enlarged and fragmentary detail of another assembly feature of the cabinet structure.
Figure 2:
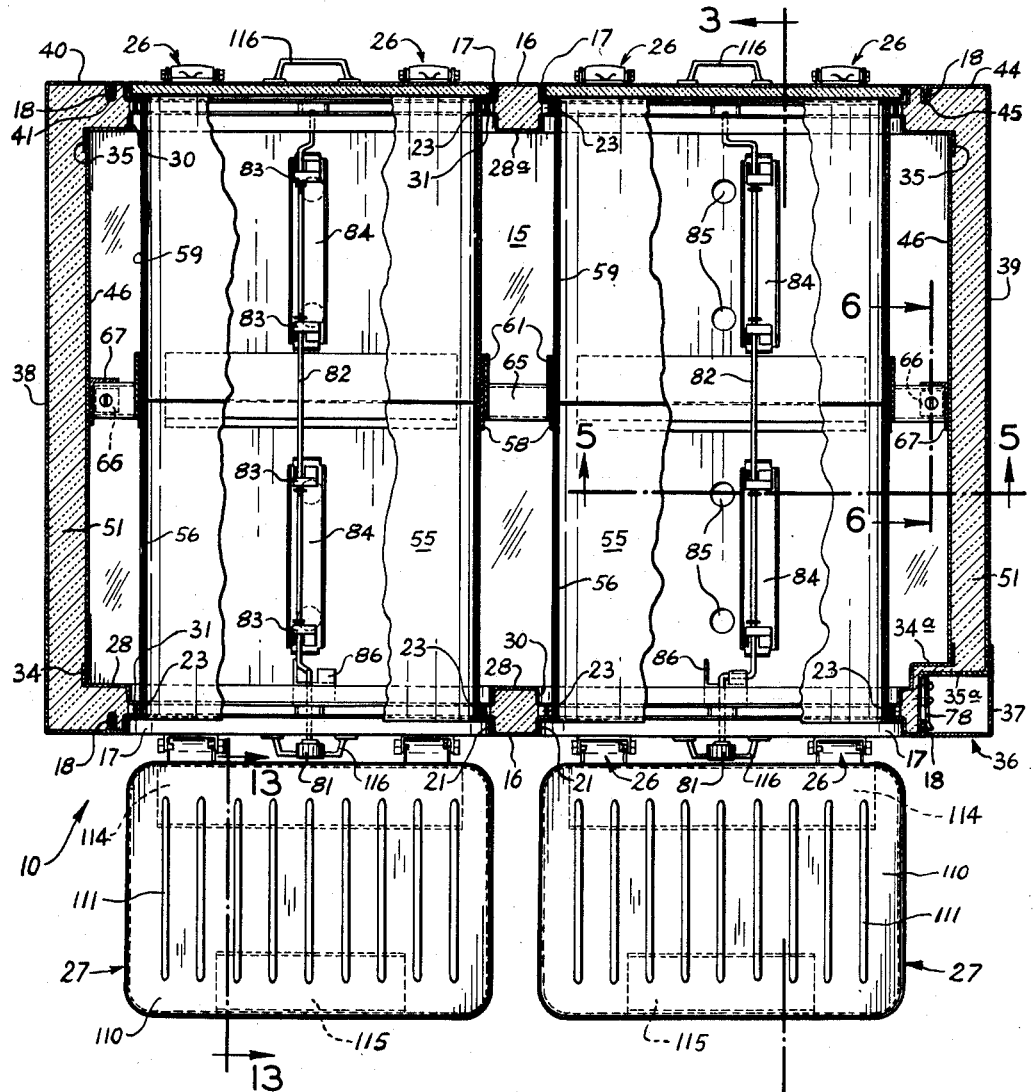
Fig. 2 is a sectional view of the cabinet as seen from above to show certain details of construction, the section being taken along line 2—2 in Fig. 1.
Figure 3:
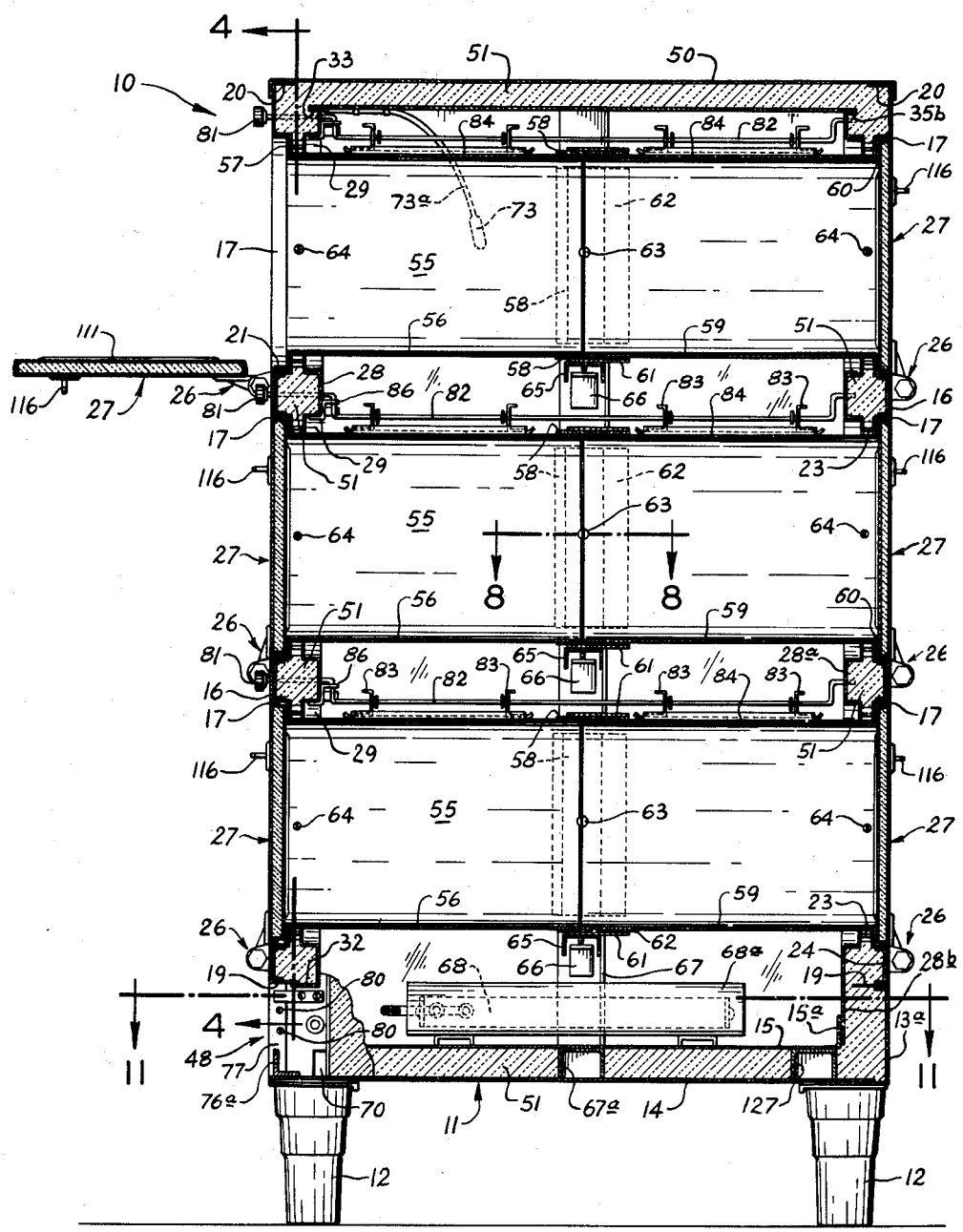
Fig. 3 is a transverse sectional elevational view of the cabinet with certain parts broken away to show details thereof as seen along line 3—3 in Fig. 2.
Figure 4:
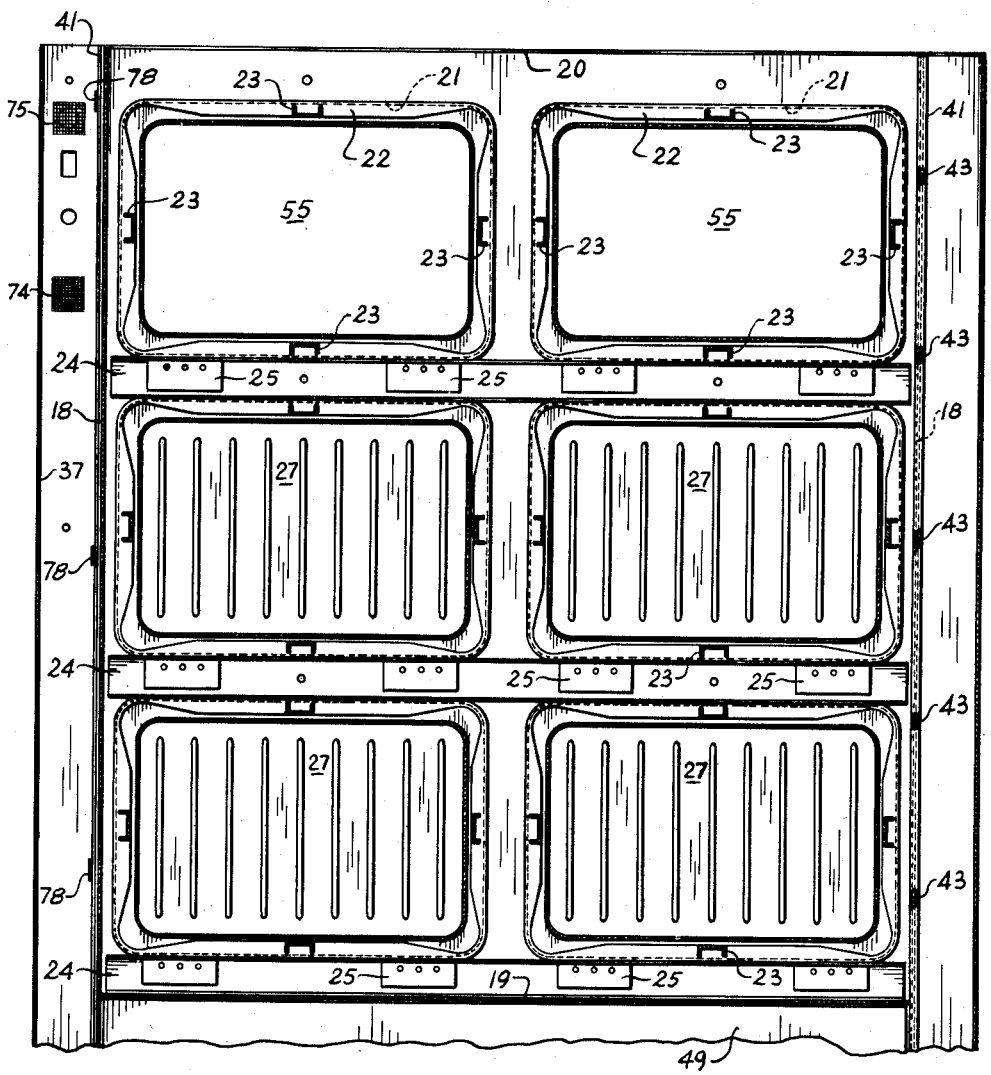
Fig. 4 is a rear elevational view of a typical apertured panel of the cabinet as seen along line 4—4 in Fig. 3.

The cabinet of Figs. 1, 2 and 3 is indicated generally at 10 and includes a base 11 supported upon corner legs 12. The base is formed with a front edge channel 13 and a rear panel 13a connected by a bottom panel 14 which encloses the bottom area and a cabinet floor panel 15 spaced above the panel 14. The base 11 supports (Fig. 3) a double wall front panel and a similar double wall rear panel, each panel being formed of an outer member 16 of similar configuration and having opening 17 therein (the specific example chosen having six openings, although any greater or lesser number of openings might be selected) which are paired in opposite horizontal registration. The members 16 are formed to provide an external part of the cabinet structure having great strength and the openings have clean rounded corners to add strength and for sanitary reasons. Each member 16 is provided with vertical and inturned side flanges 18 (Figs. 2 and 7), an inturned bottom flange 19 and a similar top flange 20. The individual openings 17 are formed with a peripheral rim 21 directed inwardly and a flange 22 (Fig. 4) thereon. Each flange 22 carries a group of channel-shaped spacers 23 arranged at the center of the sides of the openings. The means 23 function to connect the flanges 22 to other means and to space them apart, all as will appear. Also in Fig. 4 it is seen that the member 16 carries horizontal stiffner channels 24 (three being shown) extending behind the horizontal rims 21 and from side to side. Doubler plates 25 are fixed to the stiffners 24 for supporting hinges 26 which operatively support doors 27. The inturned rims 21 form recesses for flush mounting of the doors 27.

The front wall 16 is connected in spaced relation by spacer means 23 with an inner wall member 28 of substantially similar configuration having openings 29 registering with openings 17, and rims 30 and flanges 31 which are complements of rims 21 and flanges 22. The back wall 16 is connected by the spacer means 23 with an inner wall 28a which is similar to inner wall 28, except that the bottom skirt or edge on wall 28a extends downwardly at 28b and connects to the flange 15a on the floor 15 (Fig. 3). The spacer means 23 unite the walls 16 and 28 and 16 and 28a so that a rigid connection is obtained with a minimum of metal-to-metal contact. The front member 28 has a bottom flange 32 mating with flange 19 (Fig. 3), a top flange 33, one vertical side flange 34, and a special vertical side flange 34a to accommodate an inner vertical wall 35a at one corner (the lower right corner of Fig. 2) of the cabinet 10 which forms a heat control housing 36 in cooperation with an outer corner member 37. The back member 28a has vertical flanges 35, top flange 35b, and the skirt 28b.

The outer members 16 of the front and rear panels are interconnected by vertical end panels 38 and 39 (Figs. 1 and 2), in which the front and rear vertical wall strips 40 of the panel 38 have channel flanges 41 (Figs. 2 and 7) to receive the flanges 18. The channel flanges 41 have spaced cut-outs 42 which expose a portion of the flange 18 for applying weld connector material 43. The panel 39 differs from panel 38 in that it forms the inner wall strip 35a for the housing 36. The rear of panel 39 has a wall strip 44 and channel flange 45 similar to the parts 40 and 41 of panel 38.

Figure 11:
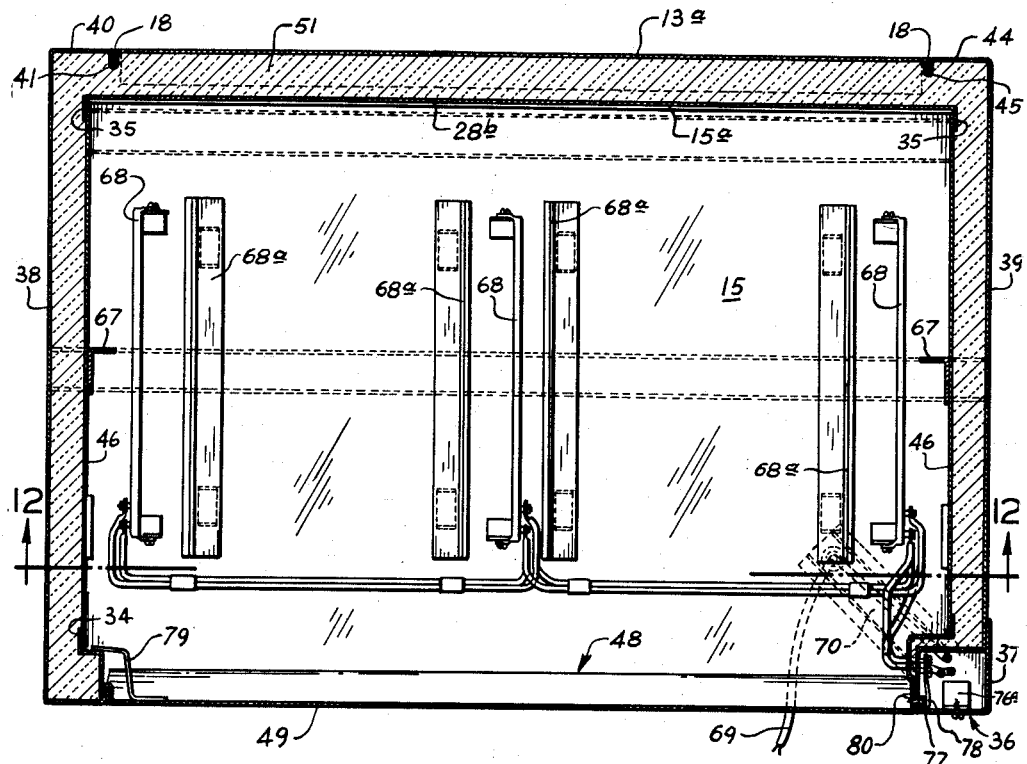
Fig. 11 is a transverse sectional view of a lower portion of the cabinet structure the view being taken at line 11—11 in Fig. 3.

The inner members 28 and 28a respectively of the front and rear panels are connected by inner end walls 46 which extend to the floor panel 15. The resulting assembly of the parts above described forms an inner frame of members 28, 28a and 46 closed at the bottom by floor panel 15. The member 28 is spaced from the floor panel 15 to form a horizontal slot-like access opening 48 at the front (Figs. 1, 3 and 11), which opening is closed by a removable panel 49. The inner frame thus formed is enclosed in a spaced outer shell formed of the front and rear members 16, side members 38 and 39, bottom 14, and a top cover 50 which rests upon similar upper flanges 20 on the members 16, 38 and 39. The space between the frame and shell is maintained by the spacers 23 (Fig. 3), and suitable insulation 51 is disposed in this space to reduce radiation and convection heat transfer, while the clips 23 reduce direct heat transfer through the parts. The base 11 is also fully insulated at 51 so that the cabinet has a very low heat loss rate.

In the pass-through type of construction of cabinet 10 shown in Fig. 3, the front and rear panels are characterized by horizontal and vertical box-section portions composed of the complementary rims 21 and 30 and the flanges 22 and 31 connected by spacers 23. The box-sections greatly strengthen the cabinet without adding unnecessary weight, and the horizontal portions are useful as load supporting means for the food compartments. Also, the channels 24 and doublers 25 add strength for the closure doors 27, whereby the hinge loads can be passed into the panels without incurring concentrated loads.

Figure 8:
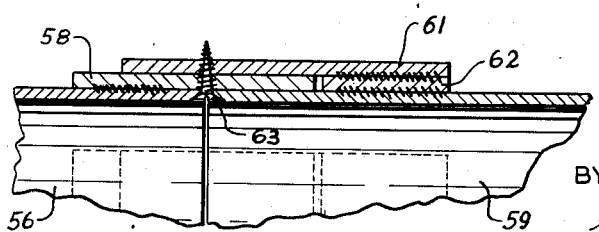
Fig. 8 is a further enlarged fragmentary sectional view seen at line 8—8 in Fig. 3.

A typical food compartment 55 for the pass-through type cabinet 10 is shown in Figs. 2 and 3. The compartment 55 consists of a front sleeve 56 having an out-turned end flange 57 which fits into the recess formed by rim 21 and abuts the rim flange 22. The inner end of this sleeve 56 carries a plurality of spaced and axially projecting flanges 58 (Figs. 3 and 8). A complementary rear sleeve 59 is similarly formed at one end with an out-turned flange 60 seated in the recess of rim 30 against flange 31. The opposite inner end carries a plurality of projecting flanges 61 which telescope over the flanges 58 on the adjacent end of sleeve 56, and in order to obtain a close fit, the flanges 61 are spaced from the body of the rear sleeve 59 by spacers 62. This arrangement of telescopic connections of the inner ends of sleeves 56 and 59 provides an end-to-end abutment of the sleeves so that the compartment 55 is free of projections which might interfere with the sliding of food containers. The sleeves 56 and 59 are secured in position by suitable locking elements 63 threaded into the telescoping flanges 58 and 61, and by similar locking elements 64 threaded into one or more of the spacers 23, all of the elements 63 and 64 being countersunk to avoid projecting into the compartment 55.

Figure 5:
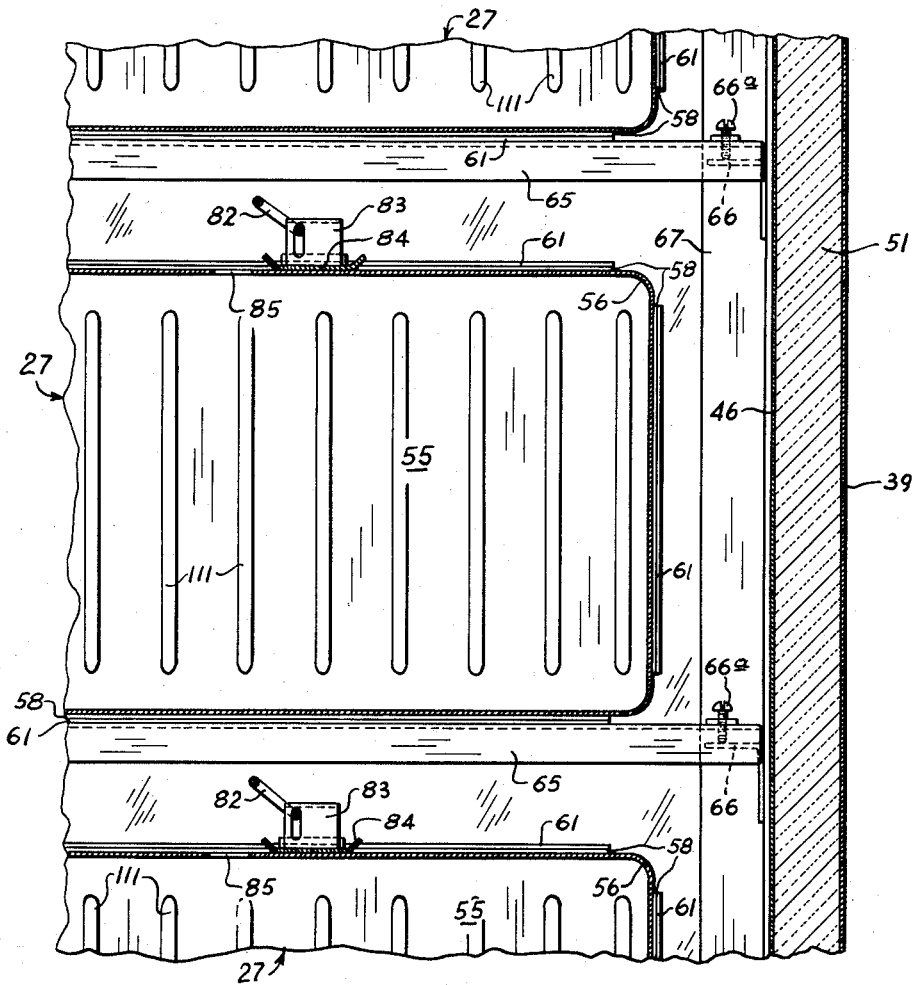
Fig. 5 is a fragmentary and enlarged longitudinal sectional elevational view of the cabinet taken along line 5—5 in Fig. 2.
Figure 6:
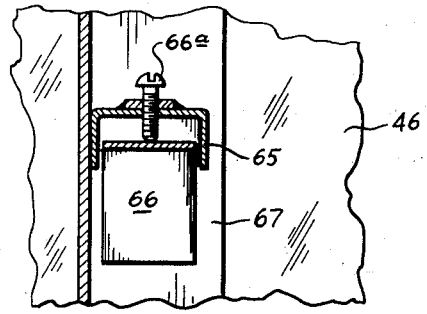
Fig. 6 is a fragmentary and enlarged detail of a certain assembly adjustment feature of the cabinet structure seen at line 6—6 in Fig. 2.

The end flanges 57 and 60 of the compartment sleeves 56 and 59 abut the flanges 22 and 31, respectively, with a minimum of area of contact to reduce heat transfer, and these flanges 57 and 60 also retain the sleeve bodies out of contact with the adjacent panel members 16 for the same purpose. In addition, the central portion of each compartment 55 is supported by suitable channel members 65 (Figs. 2 and 3) which are adjustably supported on clips 66 carried by vertical members 67 fixed to the end walls 46. The members 65 extend across the width of the cabinet. This means of support is confined to the inner frame so that the heat transmission is practically eliminated by the insulation adjacent the walls 46. A supporting member 67a of channel shape is located in base 11 under members 67. The mounting of each compartment 55 is similar to that above described, and it is readily appreciated that the front and rear sleeves are easily removed by releasing the holding elements 63 and 64. Leveling adjustment of the sleeves 56 and 59 is obtained by the screws 66a in the brackets abutting the clips 66, shown in Figs. 2, 5 and 6.

Figure 14:
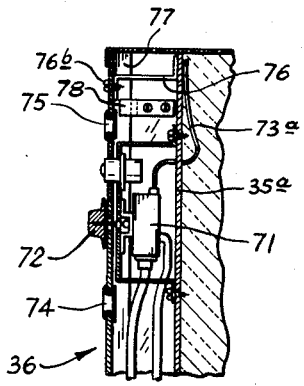
Fig. 14 is a fragmentary and broken sectional elevational view of the cabinet to show one arrangement of control means to select the temperature within the cabinet, the view being taken at line 14—14 in Fig. 1.
Figure 14:
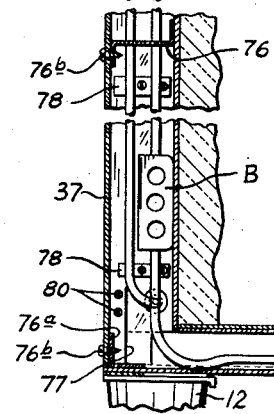
Figure 12:
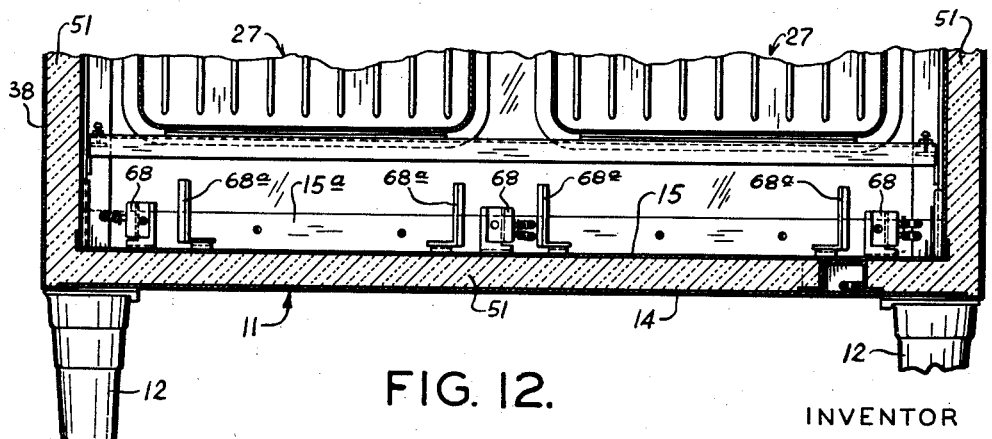
Fig. 12 is a fragmentary longitudinal sectional elevational view taken along line 12—12 in Fig. 11.

The interior of cabinet 10 is heated by one or more heating elements (three being shown in Figs. 11 and 12) 68 carried upon the floor panel 15 in the bottom of the inner frame between insulated guards 68a. The heating elements 68 (Fig. 11) shown are of suitable electrical resistance type having the current carrying wires 69 leading into the lower end of the control housing 36. The wires 69 connect with a suitable junction box B (Fig. 14) and then extend upwardly to a suitable combination on-off switch and thermostatic control device 71. The device 71 has a knob 72 at the front of panel 37 provided to select the desired cabinet temperature and actuate the on-off switch. The electrical current supply wires 69 enter the cabinet through base 11 and runs through the wire-way 70 to the housing 36. The device 71 has a responsive thermostatic element 73 (Fig. 3) in the upper portion of the cabinet 10 connected by conduit 73a to device 71 to cause proper response of the heating elements 68 in known manner. The circuit for this heating system has not been shown as it is too well known to those skilled in this art to require precise explanation. It is sufficient to point out that an on-off switch is included in the circuit, and the small heat loss from device 71 is conveniently vented from housing 36 by providing vent ports shown respectively at 74 and 75 in the removable wall 37.

Housing wall 37 is removably attached to one front corner of the cabinet 10 by a plurality of suitable brackets 76 and 76a engaged by screw elements 76b which are exposed to the adjacent end of the cabinet. The front portion of wall 37 is formed with an inturned flange 77 (Figs. 2, 3 and 11) which fits into suitable clips 78 carried on the inner wall 35 of the housing where they are fully concealed with the wall in place, as in Figs. 1 and 2. Similarly, the front panel 49 for access to the heating elements 68 is secured by suitable means 79 at one end and threaded element 80 in the flange at the other end, to remove panel 49 it is first necessary to remove wall 37 in order to get at and remove the holding element 80 (Fig. 3) in the adjacent end of the panel. This is a safety feature to insure that the elements 68 are not accessible without first actuating switch 72 and removing the housing wall 37.

In the foregoing description, reference has been made to the front of the cabinet 10 principally in relation to the control housing 36. This is merely convenient for the reason that the panel at this side is provided with a plurality of control knobs 81 (Figs. 1 and 3) disposed above each door 27, although the terms front and rear may be used interchangeably. Each control knob 81 operates a crank rod 82 pivotally mounted in the members 16 and 28a, with the central span off-set to form the crank. The crank rod 82 in each instance is connected by brackets 83 to a pair of damper plates 84 which rest upon the upper surface of the compartment 55. Each damper 84 has a pair of the brackets 83 so that swinging movement of the crank rod 82 will cause the dampers to slide sidewise to cover or uncover vent openings 85 in this wall of the compartment. A crank stop means 86 mounted on the member 28 limits closing and opening movement of the dampers so that the openings 85 can be closed or opened with positive assurance upon turning the knob 81. The provision of vent openings 85 in each compartment permits positive regulation of the moisture condition of the food. For example, if moist food is placed in the compartment, the dampers 84 should be closed so that the relatively small volume of the compartment can be relied upon to retain the moisture therein while the cabinet is heated. Dry foods may require the dampers to be opened so that the heat in the cabinet can be used to maintain the desired dry condition and avoid the development of a soggy condition due to retention of the foods in a confined space.

Figure 9:
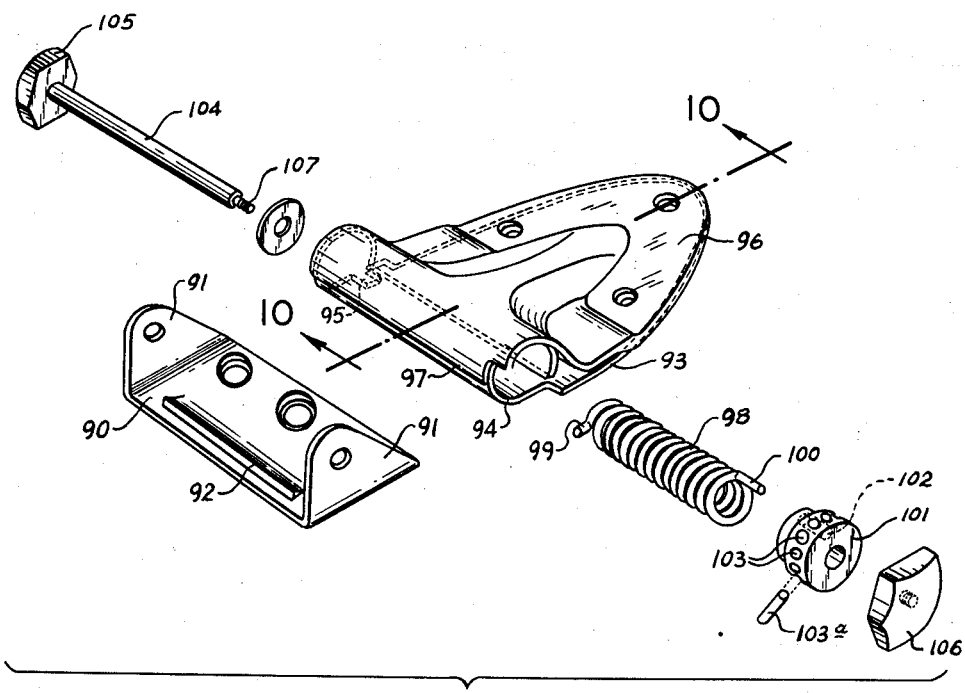
Fig. 9 is an enlarged and exploded perspective view of a hinge device shown in Fig. 1 for operatively mounting the cabinet doors.
Figure 10:
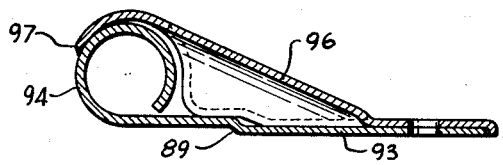
Fig. 10 is a sectional view of the hinge seen at line 10—10 of Fig. 9.

It has been pointed out that the doors 27 are hinge mounted on the cabinet. A typical hinge 26 (Figs. 9 and 10) comprises a screw mounted base 90 having the pivot ears 91 at each end and a raised tongue 92 which is punched from the base plate along three sides to form an integral abutment or stop. The hinge includes a load carrying plate 93 which is suitably rolled at 94 to form a sleeve in which a notch 95 is provided in one edge. The plate 93 is covered by a ribbed leaf 96 which partly encircles the plate sleeve 94 and ends at edge 97 which is exposed to strike abutment 92 when the leaf and plate combination is rotated relative to base 90. The parts 90 and 94 are held in operative relation by the novel arrangement of a coil spring bushing 98 which snuggly fits in sleeve 94 and has an end 99 which is turned to seat in notch 95, thereby anchoring one end of the spring bushing. The opposite end 100 of this bushing is inserted in an adjusting rotor 101 having a socket 102 for the end 100 and a cross-diameter drilled series of apertures 103 for receiving a stop pin 103a as well as a tool to wind up or adjust the spring bushing to the desired tension to cause the hinge to act as a self-closing type for the doors 27.

The spring bushing is mounted in the sleeve 94 with the end 99 in notch 94 and the socket 102 over the end 100 so that the rotor 101 fits into the end of the sleeve 94. A pin 104 having a head 105 is passed through the bushing 98 and through the apertured ears 91 of the base 90 to retain the parts in assembly. A head 106 threads onto the end 107 of the pin 104 and applies axial restraint upon the parts to retain the rotor 101. The stop pin 103a holds the spring tension at the desired value. When assembled, the parts can open until the edge 97 strikes stop 92, and may close until the plate 93 and base 90 are adjacent and parallel, there being a jobble 89 in the plate 93 to receive the base 90.

Figure 13:
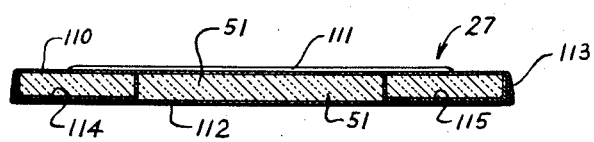
Fig. 13 is a sectional view of one of the doors on the cabinet, the details of construction being taken along line 13—13 in Fig. 2.

The hinges 26 attach doors 27 to the cabinet at the front and rear panels. Each door 27 (Figs. 3 and 13) includes an inner pan member 110 having a series of embossed ribs 111 on the surface thereof to support food containers and take the scuffing which would otherwise be taken by the full area of the pan 110. The door has an outer member 112 similar to member 110, but slightly larger to fit over the member 110 and form a slightly tapered edge which, with soldering at the joint 113 and subsequent buffing, provides a better fit of the doors in the recessed openings 17. The inner space of the door is filled with insulation 51, but first reinforcement channels 114 and 115 are secured to the member 112 to accommodate respectively the hinges 26 and handles 116.

Figure 15:
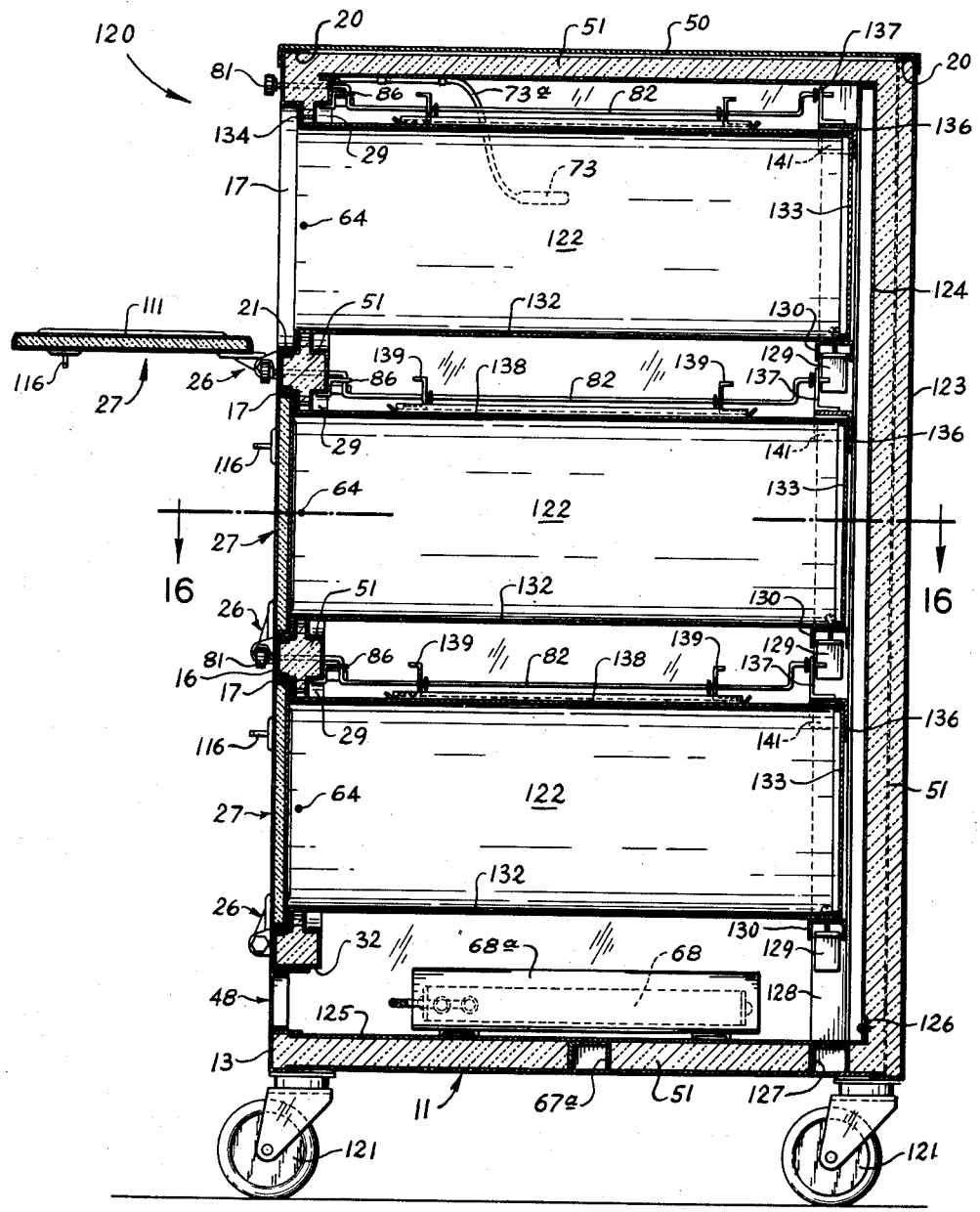
Fig. 15 is a transverse sectional elevational view of a cabinet having certain modifications in respect of the construction adapting the same to a somewhat different use.
Figure 16:
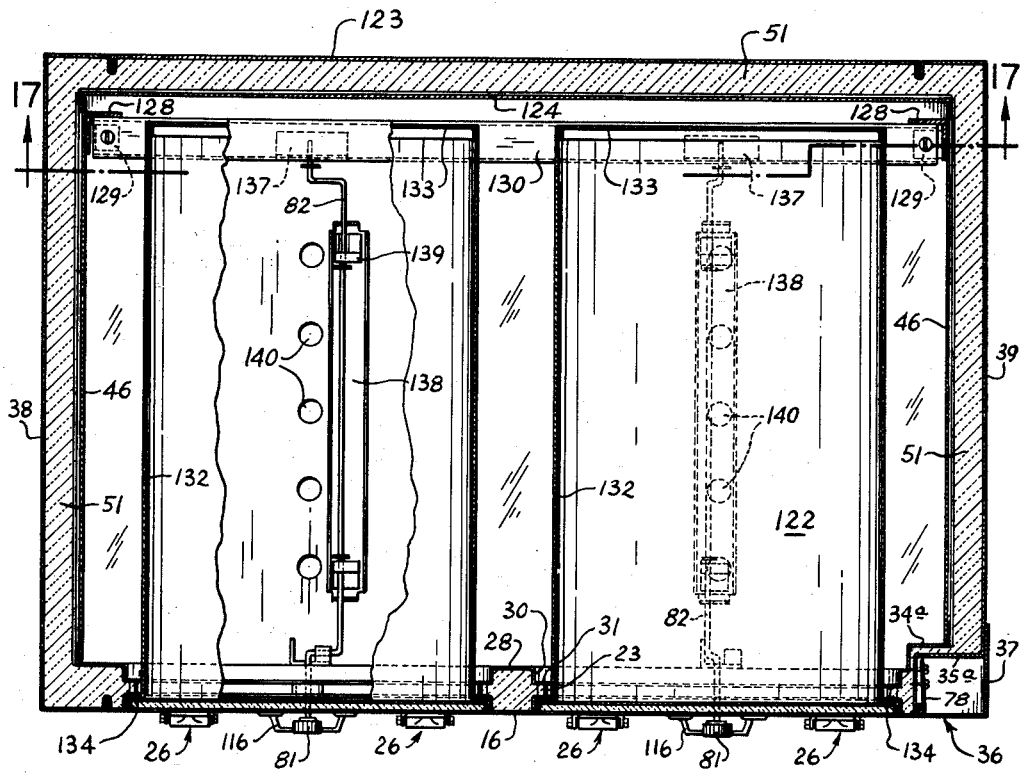
Fig. 16 is a sectional view of the cabinet of Fig. 15 as seen along line 16—16 therein.
Figure 17:
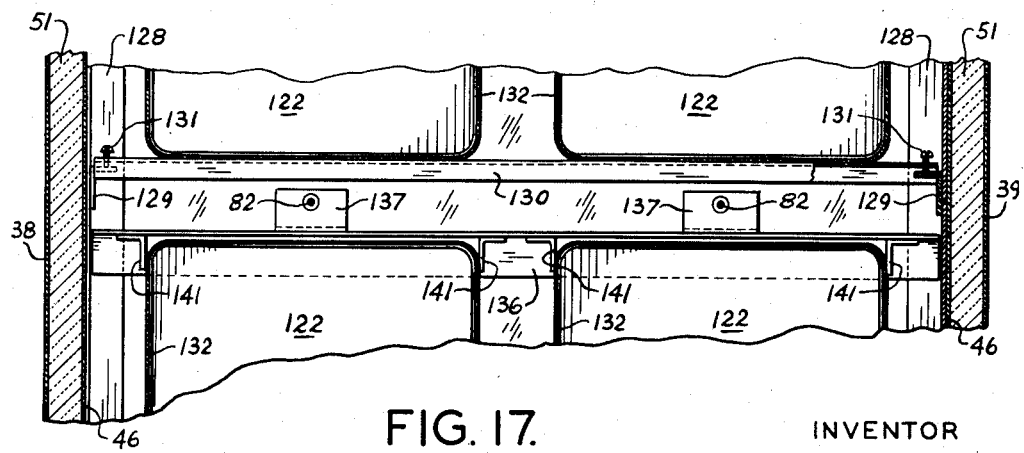
Fig. 17 is a fragmentary sectional elevational view of the cabinet construction seen along line 17—17 in Fig. 16.

The modified cabinet 120 of Figs. 15, 16 and 17 has many structural parts which are similar to the equivalent parts of the cabinet 10 and the same reference numerals are applied wherever possible. The modified cabinet 120 is arranged with suitable castering wheels 121 to make it easily movable, and only the front wall is arranged with openings 17 for access to the interior food retaining compartments 122. The rear wall is made up of an outer plain panel 123 and an inner panel 124. The opposite end (Fig. 16) walls are substantially unchanged from the construction shown in Fig. 2, and the panels are similarly identified. The space between the outer walls and the inner frame is filled with suitable insulation 51, and the base 11 is similarly insulated. In considering base 11, the inner floor plate 125 has a rear up-turned flange 126 which connects with panel 124. The plate 125 is supported upon member 67a, as before noted, and a second member 127 is placed in the base 11 to support the closed ends of the compartments 122. The member 127 is also used in the cabinet of Fig. 3, and member 67a is also used in the cabinet of Fig. 15. However, the installation of both members in these cabinets avoids assembly difficulty as the bases 11 are substantially the same, except for the use of legs 12 and casters 121.

The member 127 supports plate 125 and the vertical angle members 128 (Figs. 15 and 16) which are also attached to adjacent walls 46. Each member 128 carries clips 129 in spaced relation with horizontally aligned clips 129 so that opposite pairs of clips 129 support a horizontal channel-shaped member 130. The ends of each member 130 carry adjusting screws 131 (Fig. 17) for the purpose of leveling the compartments 122 during assembly.

Each compartment 122 consists of a sleeve 132 having a closure plate 133 secured in the back end which is supported on the members 130. The open front end of each sleeve 132 has an out-turned flange 134 thereon which is recessed in opening 17 and is supported by the rims 21. Vertical supports 128 carry a second group of horizontal angle members 136 spaced above the members 130 to act as a means for holding the compartment 122 against excessive elevation. The members 136 support angle brackets 137 located centrally of each compartment (Figs. 15 and 17) and in position to pivotally carry the end of crank rod 82 which actuate the damper plate 138 through brackets 139. The damper plate 138 controls the vent openings 140 in the compartment to regulate the moisture level as desired. Horizontal side-to-side alignment of compartments 122 (Fig. 17) is obtained by angle stops 141 fixed to the members 136.

The interior of the cabinet 120 is heated by means 68 heretofore described. The control means also has been described in relation to the disclosure of cabinet 10 in Figs. 1 and 14, and a similar control is provided for the modified cabinet 120. It is, therefore, not necessary to repeat the description in relation to Fig. 15.

The foregoing description has been given in connection with certain embodiments of the invention which are presently preferred. It is a characteristic of the invention to construct one or both front and rear walls of the cabinet as structural members to carry the compartment loads, and to provide internal support which includes adjustment means for leveling the compartments. It is also characteristic to arrange the cabinet with internal frame means and parts substantially thermally isolated from the outer shell or frame to reduce heat losses and avoid undesirable thermal exchange between the interior and exterior which would affect the moisture level beyond or outside of the range of control expected from the dampers 84 or 138.

An important characteristic is found in the form of front and rear walls. The forming of openings 17 by the rims 21 and flange 22, and the like forming of openings 29 with rims 30 and flanges 31 in Fig. 2, results in the creation of box-section structural members running both horizontally and vertically in the wall. The box-section thus formed bounds each opening about the circumference thereof so that a substantially rigid load bearing wall is constructed. Another characteristic resides in the construction of the door hinges to make them operate through substantially concealed means to close the cabinet doors, and in the arangement of parts thereof to obtain adjustment for opposing the weight of door to be operated.

The foregoing description relates to certain preferred embodiments of the present invention, but it is understood that changes and substitutions of equivalent structural parts and means may be made within the spirit of the improvements. Therefore, the scope of the invention is not intended to be limited except in so far as it may be required by the annexed claims.

What I claim is:

1. A cabinet construction comprising a double-wall body having outer walls enclosing inner walls, insulation disposed between said outer and inner walls, an outer wall of said body and the adjacent inner wall being formed with openings, each of which is defined by a rim directed toward the other rim, means connecting said rims at spaced zones to prevent substantial direct contact between said rims, the rim in said outer wall directed toward said inner wall rim forming a recess at said opening in which the space between said rims is exposed to reveal said insulation, a closure member operably connected to said outer wall and adapted to fit into said recess for closing said opening, and compartment forming means disposed in said cabinet body with an open end extending into said opening in said outer wall, the open end of said compartment means having a flange abuting said outer wall rim to support the open end of said compartment means spaced from said outer wall rim and other portions of said compartment covering said exposed space between said rims.

2. A cabinet construction comprising a double-wall body having outer walls enclosing inner walls, an outer wall in one face of said body being formed with an opening defined by an inwardly directed circumferentially extending rim, the inner wall adjacent said one outer wall also being formed with an opening defined by a circumferentially extending rim which is spaced from said first rim, means connecting said rims at zones spaced along the circumference of said rims to prevent substantial areas of direct contact, the space between said rims being exposed between said connecting means, compartment means in said body adapted to be removable through said opening in said one outer wall, said compartment means having a flange adjacent one end adapted to abut said rim in the outer wall opening to support the same in a limited area of contact adjacent the outer wall opening, other portions of said compartment means adjacent said flange covering the exposed space between said rims, and other means within said body to support a different part of said compartment means from within said inner walls.

3. A cabinet comprising a double-wall body having outer front and side walls and corresponding inner front and side walls spaced from said outer walls, said outer front wall having a plurality of openings, each defined by an inwardly directed circumferentially extending rim, and said inner front wall having a plurality of openings corresponding to said outer front wall openings and each being defined by an outwardly directed circumferentially extending rim, spaced apart elements structurally connecting said rims of corresponding openings in said outer and inner front walls in spaced relation such that said rims and the adjacent walls constitute substantially box-section members for stiffening said body, said rims being open between said spaced structural elements, compartments in said body supported in said outer front wall adjacent said box-section members, each compartment having an open end defined by a flange adapted to engage the rim of an opening in said outer wall, other portions of each compartment adjacent said flanges covering the openings between said spaced structural elements, and means releasibly connecting said compartments to adjacent ones of said structural connecting elements.

4. A cabinet comprising an insulated body structure in which a vertical wall of said body includes substantially identical outer and inner spaced part panels, each having openings arranged in registration with the openings in the other, the openings in the outer panel having an inturned rim and the openings in the inner panel having an outturned rim, said rims and panels together forming the front wall of said body as a stiff structure in which the opening through said front wall is circumferentially bounded by box-sections, means spaced about the circumference of the opening structurally connecting said panels in spaced relation and limiting interchange of heat therebetween, a compartment for said opening in said front wall, said compartment being formed with an open end and having a flange adapted to engage said rim of said opening in said outer panel to support said compartment, and a closure hingedly supported by said box-section in position to close the open end of said food compartment and fit into the openings in said outer panel within the inturned rim thereof.

5. In a cabinet assembly a cabinet body having spaced inner and outer walls for thermal insulation, an article supporting compartment therein, said compartment having an entrance opening connected to an outer wall, a closure body for said opening, hinge means connecting said closure body to said outer wall adjacent said opening and in position to form a platform to support articles in transit to and from said compartment, said hinge means including a stop within the hinge structure to limit opening movement of said closure body to said platform position, and means carried by said outer wall adjacent said hinge means to receive the load of said closure body in platform position through said hinge means and distribute the load in the adjacent areas of said outer wall.

6. A cabinet for holding food in a ready-to-serve condition comprising a body having an inner frame structure, an outer shell structure enclosing said inner frame structure, spacer means fixed to said frame and shell structures to hold the same in spaced relation for substantially thermally separating said structure, heating means carried in said inner frame structure, an outer removable wall forming a part of said outer shell structure, said outer removable wall defining with adjacent portions of said outer shell structure a housing in said body, control means disposed in said housing and electrically connected to said heating means to regulate the heat level within said inner frame structure, food supporting compartment means in said body having an open end extending through said outer shell structure and supported thereby, said compartment means having a vent opening to the space within said inner frame structure, damper means operatively mounted in said body in position to selectively cover and uncover said vent opening, whereby to regulate the heat and moisture of the food placed in said compartment means, and closure means for said open end of said compartment means, said closure means being hinged upon said outer shell structure.

7. The cabinet set forth in claim 6, and further comprising means in said inner frame structure to support said compartment means spaced from said outer shell structure, said means including a member extending below said compartment means, and other means to adjust the elevation of said member for leveling said compartment means.

8. The cabinet set forth in claim 6, and further comprising the food supporting compartment means having a second open end extending through and supported by another portion of said outer shell structure, whereby food may pass through said compartment means between said open ends, a second closure means for said second open end hingedly connected to said outer shell structure, and means in said inner frame structure to support said compartment means between said open ends thereof, said compartment means being formed of two sleeve sections connected together, and said supporting means including an adjustable member extending beneath said sleeve sections to adjust the elevation thereof simultaneously.

9. A cabinet construction comprising a vertically erect body having a plurality of panels connected together to form an outer rectangular shell, a liner enclosed by said shell in spaced relation, electrical heating means disposed in a lower portion of said body adjacent the inside of said liner, one vertically extending corner of said body shell being inwardly off-set to form an elongated space outside said liner, a removable cover for said corner space, control means in said corner space connected to said electrical heating means, a bottom panel of said shell having an aperture therein, a passage forming member extending from said bottom panel aperture to said elongated corner space, and electrical supply means extending through said passage member from said aperture and connected to said control means.

10. The cabinet construction of claim 9, wherein said aperture in a bottom panel is located spaced from the two adjacent margins of the cabinet, and said passage forming member is similarly spaced from said two margins, whereby the electrical supply means is accessible from either margin of the cabinet.

11. The improvements in a cabinet comprising a body having an inner frame, an outer shell spaced from said frame, spacer means connected between said frame and shell so that said shell is substantially thermally isolated, said body having an opening formed by openings through said shell and frame each defined by a rim, means spaced around said body opening connecting said rims together in spaced relation providing a space which is a thermal barrier to heat transfer, said inner frame, outer shell, said rims defining said body opening and said means spaced around said body opening constituting a box-section structure, a compartment in said body with an open end in said body opening, flange means on said open end adapted to mount said compartment in said body opening in abutment with one of said rims, said body having a portion adjacent said flange means covering the space formed between said rims, said flange means spacing said compartment from the box-section structure, and support means carried by said body and adapted to support said compartment at a zone spaced from said flange means.

References Cited in the file of this patent

UNITED STATES PATENTS

| Number | Name | Date |
|---|---|---|
| 1,131,664 | Bommer | Mar. 16, 1915 |
| 1,617,431 | Wolverton | Feb. 15, 1927 |
| 1,678,730 | Johnson | July 31, 1928 |
| 1,803,330 | Johnson | May 5, 1931 |
| 1,931,334 | Teller et al. | Oct. 17, 1933 |
| 2,372,249 | Bruen | Mar. 27, 1945 |
| 2,393,879 | Barnsteiner | Jan. 29, 1946 |
| 2,547,550 | Whitmore | Apr. 3, 1951 |
| 2,561,517 | Ladge | July 24, 1951 |
| 2,584,886 | Laguzzi | Feb. 5, 1952 |
| 2,750,901 | McClellan | June 19, 1956 |